(12) United States Patent
Morise et al.

(10) Patent No.: US 7,481,734 B2
(45) Date of Patent: Jan. 27, 2009

(54) HYDRAULIC CONTROL APPARATUS AND HYDRAULIC CONTROL METHOD OF VEHICULAR AUTOMATIC TRANSMISSION

(75) Inventors: Masaru Morise, Nukata-gun (JP); Hideki Miyata, Okazaki (JP); Hiromichi Kimura, Okazaki (JP); Yuji Yasuda, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 372 days.

(21) Appl. No.: 11/488,147

(22) Filed: Jul. 18, 2006

(65) Prior Publication Data
US 2007/0021261 A1 Jan. 25, 2007

(30) Foreign Application Priority Data
Jul. 19, 2005 (JP) .............................. 2005-209014

(51) Int. Cl.
*F16H 31/00* (2006.01)
(52) U.S. Cl. ....................................................... 475/119
(58) Field of Classification Search .................. 475/119; 477/906
See application file for complete search history.

(56) References Cited

U.S. PATENT DOCUMENTS 6,357,289 B1 3/2002 Futawatari
6,375,591 B1* 4/2002 Wakahara et al. ............ 475/119
6,544,139 B1 4/2003 Gierer et al.
6,780,131 B2* 8/2004 Itou et al. .................... 475/127
6,907,970 B2* 6/2005 Sugimura .................... 188/382
7,128,676 B2* 10/2006 Kinugasa et al. ............... 475/5
7,264,573 B2* 9/2007 Takagi ......................... 477/156
7,402,123 B2* 7/2008 Kobayashi et al. ............ 477/75
2002/0151408 A1 10/2002 Nishina et al.
2004/0226785 A1 11/2004 Sugimura

FOREIGN PATENT DOCUMENTS

| EP | 0 474 865 A1 | 3/1992 |
| EP | 0 538 243 A2 | 4/1993 |
| JP | 2002-533630 | 10/2002 |
| WO | WO 96/12127 | 4/1996 |

* cited by examiner

*Primary Examiner*—Dirk Wright
(74) *Attorney, Agent, or Firm*—Oblon, Spivak, McClelland, Maier & Neustadt, P.C.

(57) ABSTRACT

A hydraulic control apparatus of a vehicular automatic transmission has a plurality of hydraulic friction engagement devices that are selectively engaged and released to establish a plurality of forward speed change stages of different speed change ratios. The forward speed change stages are achieved through engagement of predetermined friction engagement devices, of the plurality of friction engagement devices. If it is determined that a predetermined speed change stage corresponding to a predetermined shift output is not established, the hydraulic control apparatus identifies a hydraulic friction engagement device having a bad engagement that is a cause of the non-establishment of the predetermined speed change stage, on the basis of the state of engagement oil pressure of the predetermined friction engagement device.

18 Claims, 10 Drawing Sheets

FIG. 2

|  | C1 | C2 | B1 | B2 | B3 | F1 |
|---|---|---|---|---|---|---|
| 1ST | O |  |  | ◎ |  | △ |
| 2ND | O |  | O |  |  |  |
| 3RD | O |  |  |  | O |  |
| 4TH | O | O |  |  |  |  |
| 5TH |  | O |  |  | O |  |
| 6TH |  | O | O |  |  |  |
| R |  |  |  | O | O |  |
| N |  |  |  |  |  |  |

◎ ACTUATED AT THE TIME OF ENGINE BRAKE

△ ACTUATED ONLY AT THE TIME OF DRIVING VEHICLE

HYDRAULIC CONTROL APPARATUS AND HYDRAULIC CONTROL METHOD OF VEHICULAR AUTOMATIC TRANSMISSION

INCORPORATION BY REFERENCE

The disclosure of Japanese Patent Application No. 2005-209014 filed on Jul. 19, 2005, including the specification, drawings and abstract, is incorporated herein by reference in its entirety.

BACKGROUND OF THE INVENTION

1. Field of Invention

The invention relates to a hydraulic control apparatus and a hydraulic control method of a vehicular automatic transmission which selectively achieve a plurality of speed change stages by combinations of engagement of a plurality of hydraulic friction engagement devices. More particularly, the invention relates to a technology that identifies a hydraulic friction engagement device having a bad engagement that has caused a failure in obtaining a speed change stage corresponding to a shift output, if such a failure occurs.

2. Description of Related Art

The hydraulic control apparatus of an automatic transmission has hydraulic friction clutches and brakes used for speed shifts, and an electronic control device that includes a microprocessor. The hydraulic actuators of the friction clutches and brakes are respectively provided with control valves. The hydraulic control apparatus of an automatic transmission further has electromagnetic changeover valves and pressure control valves for controlling the hydraulic actuators. The electromagnetic changeover valves and the pressure control valves are electrically controlled by the electronic control device, in accordance with a vehicle operation parameter, that is, one of the speed change stage of the automatic transmission, the load of the engine, and the vehicle speed. For example, Japanese Patent Application Publication No. JP-A-2002-533630 describes a hydraulic control apparatus of a vehicular automatic transmission in which when the electronic control device or the like has a failure, the electromagnetic valves and the pressure control valves are switched to a non-electric current state, and the gear is automatically changed to a low speed gear (particularly, the 3rd speed gear) if a low-speed gear has been set at the time of the failure, and the gear is automatically changed to a high-speed gear (particularly, the 5th speed gear) if a high speed gear has been set at the time of the failure.

According to the hydraulic control apparatus as described above, if a failure occurs while the vehicle is running in a low speed gear, for example, one of the 1st to 3rd speed gears, the automatic transmission is changed to the 3rd speed gear stage. If a failure occurs while the vehicle is running in a high speed gear, for example, one of the 4th to 6th speed gears, the automatic transmission is changed to the 5th speed gear stage. Therefore, the sharp deceleration at the time of occurrence of a failure can be resolved, and the vehicle can be taken off again.

However, in the aforementioned hydraulic control apparatus of a vehicular automatic transmission, when a failure occurs, the site of occurrence of the failure is not identified. Therefore, there are problems of degraded controllability during the running of the vehicle with a failure, and increased repair man-hours at service plants.

SUMMARY OF THE INVENTION

It is an object of the invention to provide a hydraulic control apparatus and a hydraulic control method of a vehicular automatic transmission which are capable of identifying the site of occurrence of a failure if any occurs.

In a hydraulic control apparatus of a vehicular automatic transmission in accordance with a first aspect of the invention, a plurality of hydraulic friction engagement devices are selectively engaged and released to establish a plurality of forward speed change stages of different speed change ratios, wherein the engagement of a predetermined friction engagement device of the plurality of friction engagement devices is an requirement for achieving forward speed change stages. The hydraulic control apparatus of the vehicular automatic transmission includes (a) an engagement oil pressure state determination portion that determines a state of engagement oil pressure of the predetermined friction engagement device, (b) a speed change stage non-establishment determination portion that determines that a predetermined speed change stage corresponding to a predetermined shift output is not established, and (c) an identification portion that identifies a friction engagement device having a bad engagement that is a cause of non-establishment of the speed change stage based on a determination result provided by the engagement oil pressure state determination portion if it is determined by the speed change stage non-establishment determination portion that a predetermined speed change stage corresponding to the predetermined shift output is not established.

According to the first aspect, when it is determined by the speed change stage non-establishment determination portion that the predetermined speed change stage corresponding to a predetermined shift output is not established, the identification portion identifies a hydraulic friction engagement device having a bad engagement that is a cause of the non-establishment of the speed change stage based on the determination result provided by the engagement oil pressure state determination portion. Therefore, when a failure occurs, the site of occurrence of the failure can be identified.

The identification portion may identify, of friction engagement devices that establish the predetermined speed change stage, a friction engagement device different from the predetermined friction engagement device if the state of engagement oil pressure of the predetermined friction engagement device is normal. The identification portion may identify, of the friction engagement devices that establish the predetermined speed change stage, the predetermined friction engagement device if the state of engagement oil pressure of the predetermined friction engagement device is abnormal. According to this aspect, when a failure occurs, the site of occurrence of the failure can be identified.

Furthermore, the speed change stage non-establishment determination portion may determine occurrence of a neutral fail of the automatic transmission based on an input shaft rotation speed and an output shaft rotation speed of the automatic transmission. According to this aspect, it is determined that the predetermined speed change stage corresponding to a predetermined shift output is not established on the basis of the occurrence of the neutral fail.

In a hydraulic control apparatus of a vehicular automatic transmission in accordance with a second aspect of the invention, at least two hydraulic friction engagement devices selected from a plurality of hydraulic friction engagement devices are selectively engaged to establish a plurality of forward speed change stages of different speed change ratios. The hydraulic control apparatus includes (a) a first speed change stage non-establishment determination portion that determines that a first speed change stage corresponding to a first shift output is not established, (b) a failure-time speed change stage changing portion that generates a second shift output which releases one hydraulic friction engagement device of hydraulic friction engagement devices that establish the first speed change stage and which engages another hydraulic friction engagement device, so as to establish the second speed change stage, if it is determined by the first speed change stage non-establishment determination portion that the first speed change stage is not established, (c) a second speed change stage non-establishment determination portion that determines that the second speed change stage corresponding to the second shift output is not established, and (d) an identification portion that identifies a hydraulic friction engagement device having a bad engagement based on whether or not it is determined by the second speed change stage non-establishment determination portion that the second speed change stage is not established.

According to the second aspect, if it is determined by the first speed change stage non-establishment determination portion that the first speed change stage corresponding to the first shift output is not established, the failure-time speed change stage changing portion generates the second shift output which releases one of the hydraulic friction engagement devices that establish the first speed change stage and which engages another hydraulic friction engagement device, so as to establish a second speed change stage. The identification portion identifies the hydraulic friction engagement device having a bad engagement on the basis whether of not it is determined by the second speed change stage non-establishment determination portion that the second speed change stage corresponding to the second shift output is not established. Therefore, when a failure occurs, the site of occurrence of the failure can be identified. According to this aspect, it becomes unnecessary to have hydraulic sensors or hydraulic switches for detecting the state of engagement oil pressure of the hydraulic friction engagement devices or the engagement oil pressure state determination portion that determines the state of engagement oil pressure, on the basis of the signals from the hydraulic sensors or hydraulic switches.

The first speed change stage non-establishment determination portion may determine whether or not the first speed change stage has been established by determining occurrence of a neutral fail of the automatic transmission based on an input shaft rotation speed and an output shaft rotation speed of the automatic transmission. According to this aspect, it can be easily determined that the speed change stage corresponding to the first shift output is not established, on the basis of the occurrence of the neutral fail.

Furthermore, the second speed change stage non-establishment determination portion may determine whether or not the second speed change stage has been established by determining occurrence of a neutral fail of the automatic transmission based on an input shaft rotation speed and an output shaft rotation speed of the automatic transmission. According to this aspect, it can be easily determined that the speed change stage corresponding to the second shift output is not established, on the basis of the occurrence of the neutral fail.

Furthermore, the identification portion may identify, of hydraulic friction engagement devices that establish the first speed change stage, a hydraulic friction engagement device released by the second shift output if it is determined that the second speed change stage has been established, and the identification portion may identify, of the hydraulic friction engagement devices that establish the first speed change stage, a hydraulic friction engagement device not released by the second shift output if it is determined that the second speed change stage is not established. According to this aspect, when a failure occurs, the site of occurrence of the failure can be identified.

In the first or second aspect, the hydraulic control apparatus may further include an automatic shift control portion that produces shift outputs for achieving, of the speed change stages of the automatic transmission, speed change stages other than the speed change stages that are established on condition that the hydraulic friction engagement device identified by the identification portion is engaged.

As in the foregoing aspect, when there is a failure, the speed change stages that require, as a condition for the establishment thereof, the engagement of the hydraulic friction engagement device identified as having a failure by the identification portion are excluded in the determination of a speed change stage. This hydraulic control apparatus reduces the considerable change in the speed change ratio caused by occurrence of a failure during the running of the vehicle, and makes it possible to take off the vehicle after a temporary stop, and thus prevents, as much as possible, occurrence of impediments to the running of the vehicle.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 2 is a diagram illustrating the states of operation of engagement elements of the vehicular automatic transmission shown in FIG. 1;

DETAILED DESCRIPTION OF THE PREFERRED EMBODIMENTS

Embodiments of the invention will be described in detail hereinafter with reference to the drawings.

Figure 1:
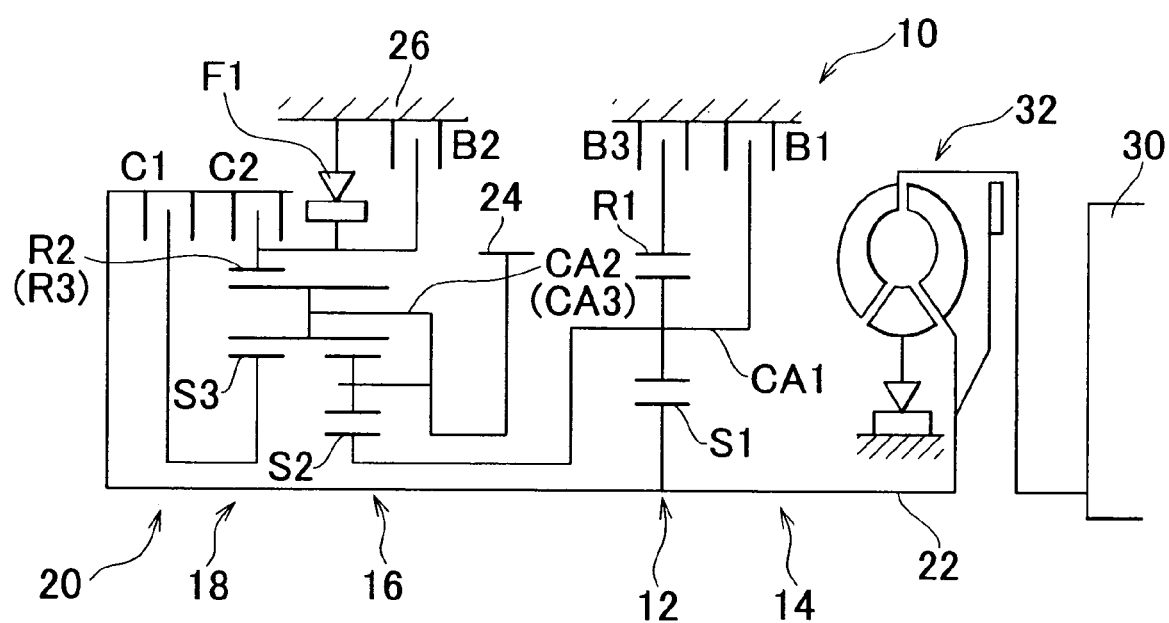
FIG. 1 is a skeleton diagram illustrating the construction of a vehicular automatic transmission to which the invention is applied.

FIG. 1 is a skeleton diagram of a vehicular automatic transmission 10. FIG. 2 is an operation table illustrating the state of operation of engagement elements for establishing a plurality of speed change stages. This automatic transmission 10 is suitably used in an FF vehicle in which the automatic transmission is mounted in a right-to-left direction (transverse layout). The automatic transmission 10 has a first speed changer portion 14 that is formed mainly by a single-pinion type first planetary gear set 12, and a second speed changer portion 20 that is formed as a Ravigneaux type mainly by a double-pinion type second planetary gear set 16 and a single-pinion type third planetary gear set 18. The first speed changer portion 14 and the second speed changer portion 20 are provided on the same axis. The rotation of an input shaft 22 is changed in speed, and is output via an output rotating member 24. The input shaft 22 corresponds to an input member, and, in this embodiment, is a turbine shaft of a torque converter 32 that is rotationally driven by an engine 30 that is a power source for running the vehicle. The output rotating member 24 corresponds to an output member of the automatic transmission 10, and functions as an output gear that is meshed with a differential driven gear (large-diameter gear) 36 to transfer power to a differential gear set 34 shown in FIG. 3, that is, as a differential drive gear. The output of the engine 30 is transferred to a pair of driving wheels (front wheels) 40 via the torque converter 32, the automatic transmission 10, the differential gear set 34, and a pair of axles 38. The automatic transmission 10 is constructed substantially symmetrically about a center line thereof, and a half thereof below the center line is omitted in FIG. 1.

The automatic transmission 10 establishes six forward speed change stages, that is, the 1st speed change stage "1st" to the 6th speed change stage "6th", and a reverse speed change stage, that is, the reverse speed change stage "R", in accordance with combinations of the coupled states of two or more of rotating elements (sun gears S1 to S3, carriers CA1 to CA3, ring gears R1 to R3) of the first speed changer portion 14 and the second speed changer portion 20. As shown in FIG. 2, as for the forward gear stages, the 1st speed gear stage is established by the engagement of a clutch C1 and the engagement of a brake B2; the 2nd speed gear stage is established by the engagement of the clutch C1 and the engagement of a brake B1; the 3rd speed gear stage is established by the engagement of the clutch C1 and the engagement of a brake B3; the 4th speed gear stage is established by the engagement of the clutch C1 and the engagement of a clutch C2; the 5th speed gear stage is established by the engagement of the clutch C2 and the engagement of the brake B3; and the 6th speed gear stage is established by the engagement of the clutch C2 and the engagement of the brake B1. The reverse gear stage is established by the engagement of the brake B2 and the engagement of the brake B3. A neutral state is established by the release of all of the clutches C1, C2 and the brakes B1 to B3. In the automatic transmission 10 of this embodiment, two hydraulic friction engagement elements are engaged in order to achieve a predetermined gear stage. If one of the two hydraulic friction engagement elements for a predetermined gear stage is not sufficiently engaged, the automatic transmission 10 falls into a neutral fail state exhibiting a speed change ratio that is greater than the speed change ratio that corresponds to the aforementioned predetermined gear stage.

The operation table of FIG. 2 shows the relationships between the aforementioned speed change stages and the states of operation of the clutches C1, C2 and the brakes B1 to B3, where "○" indicates engagement, and "◎" indicates engagement only at the time of the engine brake. The three brakes B1, B2, B3 are selectively coupled to a transmission case 26 shown in FIG. 1, in order to establish each speed change state. A one-way clutch F1 is provided in parallel with the brake B2 that is actuated for establishment of the 1st speed change stage "1st". Therefore, it is not altogether necessary to engage the brake B2 at the time of taking off (acceleration). Furthermore, the speed change ratio of each speed change stage is appropriately determined by the gear ratios (=the number of teeth of the sun gear/the number of teeth of the ring gear) ρ1, ρ2, ρ3 of the first planetary gear set 12, the second planetary gear set 16, and the third planetary gear set 18, respectively.

The clutches C1, C2 and the brakes B1 to B3 (hereinafter, referred to simply as "clutch C" and "brake B" when not particularly distinguished) are hydraulic friction engagement devices that are engaged and controlled by hydraulic actuators such as multi-disc clutches or brakes, or the like. The hydraulic friction engagement elements are changed between the released state and the engaged state, and the transitional oil pressure thereon at the time of engagement or release, etc., are controlled through the energization and deenergization and the electric current control of linear solenoid valves SL1 to SL5 provided in a hydraulic control circuit 98 (see FIG. 3).

Figure 4:
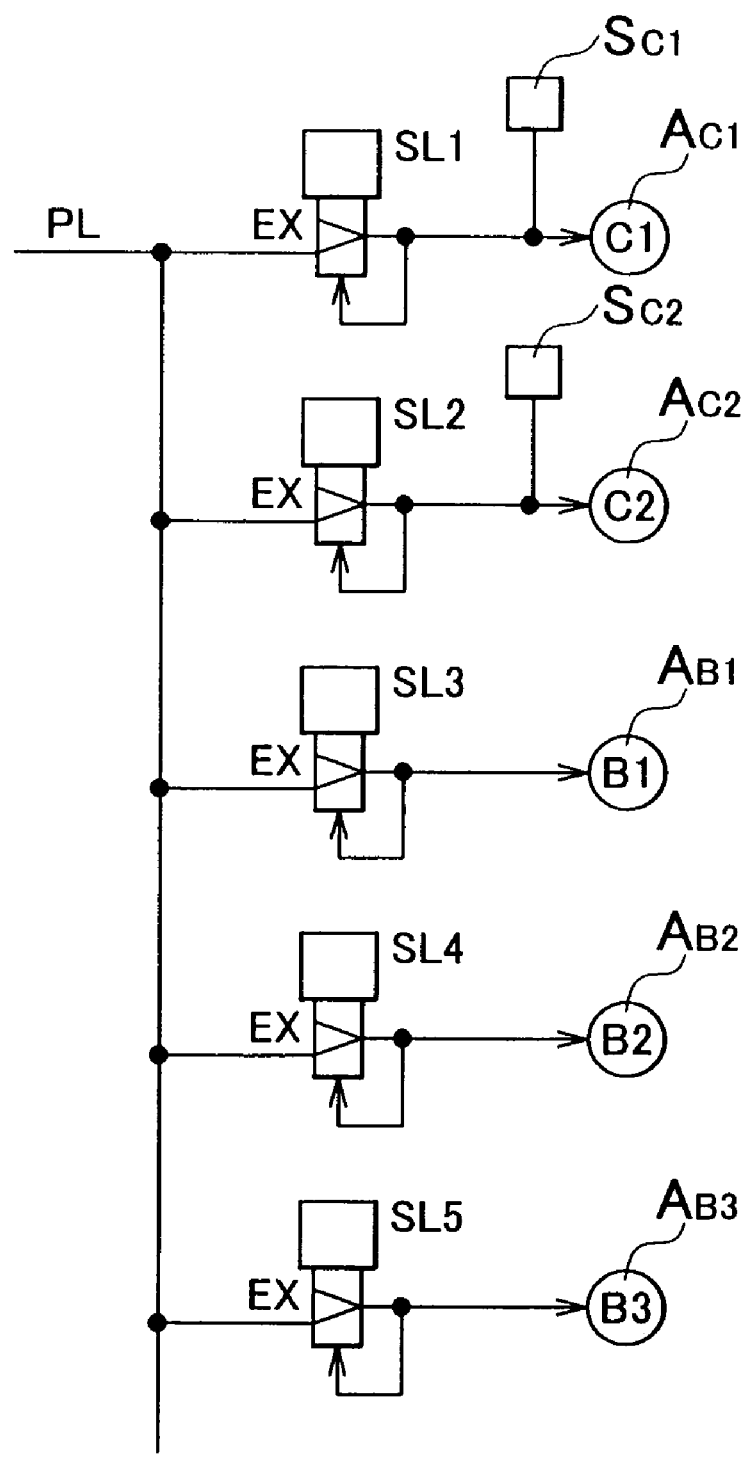
FIG. 4 is a circuit diagram illustrating portions of a hydraulic control circuit shown in FIG. 3.

FIG. 4 is a circuit diagram showing portions related to the linear solenoid valves SL1 to SL5 in the hydraulic control circuit 98. Hydraulic actuators (hydraulic cylinders) AC1, AC2, AB1, AB2, AB3 of the clutches C1, C2 and the brakes B2 to B3 are supplied with engagement pressures obtained by regulating a line oil pressure PL via the linear solenoid valves SL1 to SL5 so that the engagement pressures reach levels that are in accordance with command signals from the electronic control device 90. The oil pressure PL is obtained by regulating the output pressure of a mechanical oil pump that is rotationally driven by the engine 30 or of an electromagnetic oil pump, via a relief-type pressure regulating valve so that the oil pressure PL reaches a value that is in accordance with the engine load or the like represented by the amount of accelerator operation or the degree of throttle opening.

Figure 5:
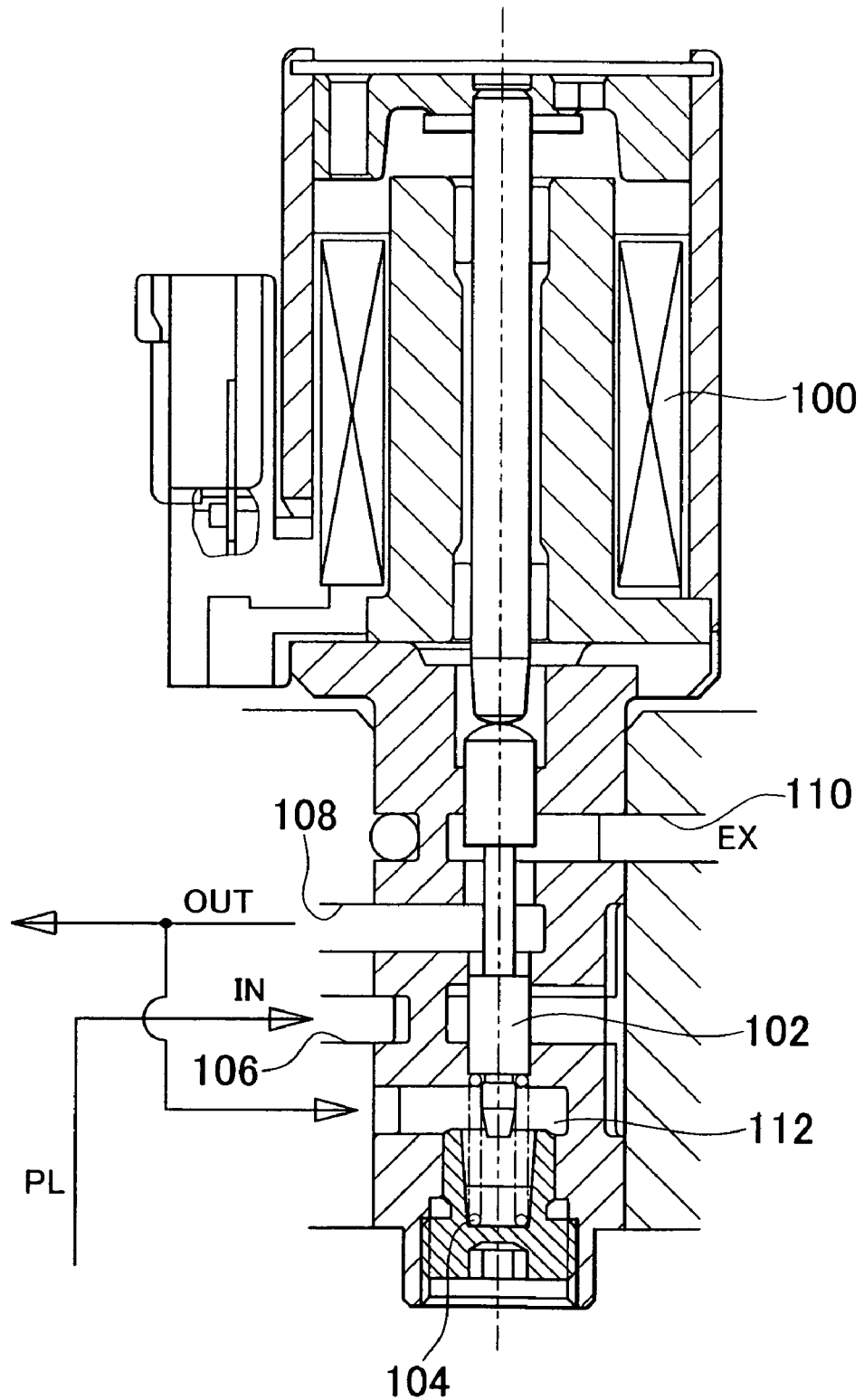
FIG. 5 is a sectional view showing an example of linear solenoid valves shown in FIG. 4.

The linear solenoid valves SL1 to SL5 correspond to speed shift-purpose solenoid valves, and basically have the same construction. In this embodiment, the linear solenoid valves SL1 to SL5 are of a normally closed-type. A solenoid valve shown in FIG. 5 is an example thereof. The solenoid valve comprises a solenoid 100 that generates electromagnetic force in accordance with the energizing current therethrough, a spool 102, a spring 104, an input port 106 supplied with the oil pressure PL, an output port 108 that outputs regulated oil pressure, a drain port 110, and a feedback oil chamber 112 to which the output oil pressure is supplied. Then, the spool 102 is moved so that the output pressure (feedback oil pressure) Pout supplied to the feedback oil chamber 112, the pressure receiving area Af of the feedback oil chamber 112, the load Fls of the spring 104, and the electromagnetic force (thrust force in the valve opening direction) F created by the solenoid 100 satisfy the following equation (1). That is, as expressed by an equation (2) modified from the equation (1), the output pressure (engagement pressure, feedback oil pressure Pout) is regulated and controlled by changing the state of communication between the input port 106, the output port 108 or the drain port 110 in accordance with the electromagnetic force F of the solenoid 100. The thus-regulated oil pressures are supplied to the hydraulic actuators AC1, AC2, AB1, AB2, AB3. The solenoid 100 of each of the linear solenoid valves SL1 to SL5 is independently energized by the electronic control device 90 so that the oil pressures on the hydraulic actuators AC1, AC2, AB1, AB2, AB3 are independently regulated and controlled.

$$F = Pout \times Af + Fls \quad (1)$$

$$Pout = (F - Fls)/Af \quad (2)$$

A hydraulic switch SC1 and a hydraulic switch SC2 for detecting the output pressures of the solenoid valves SL1 and SL2, that is, the engagement pressures of the clutch C1 and the clutch C2, respectively, are connected between the solenoid valve SL1 and the hydraulic actuator AC1 of the clutch C1, and between the solenoid valve SL2 and the hydraulic actuator AC2 of the clutch C2. Each of the hydraulic switch SC1 and the hydraulic switch SC2 generates an output signal when the engagement pressure of the clutch C1, C2 becomes equal to or higher than a predetermined value pre-set for determining the completion of engagement, for example, a value close to the oil pressure PL. As shown in FIG. 2, at least one of the clutch C1 and the clutch C2 is engaged for any one of the forward gear stages, and corresponds to a predetermined hydraulic friction engagement device. That is, the engagement of the clutch C1 or the clutch C2 is a requirement for achieving any forward gear stage.

Figure 3:
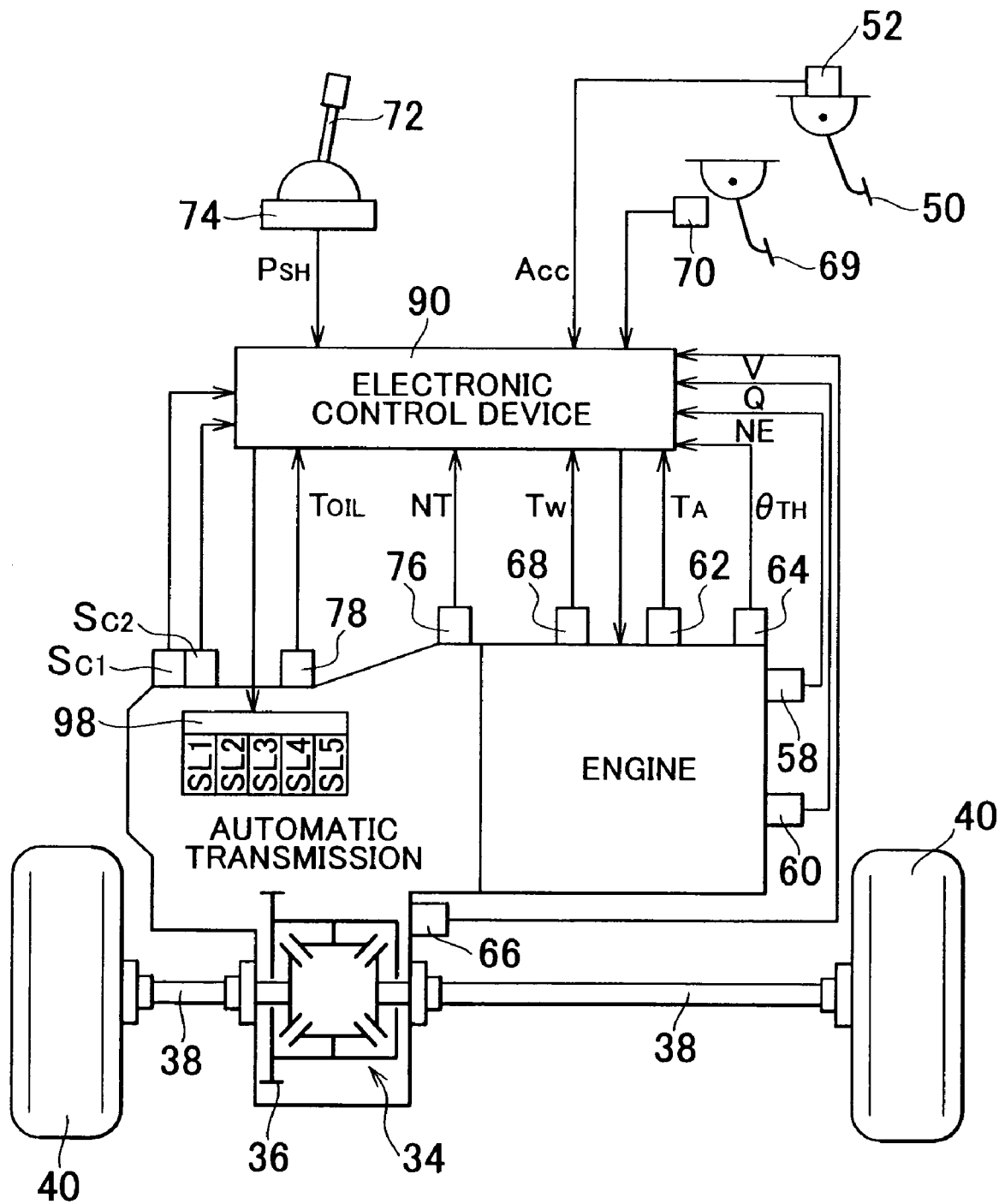
FIG. 3 is a block diagram illustrating portions of a control system provided in the vehicular automatic transmission shown in FIG. 1.

FIG. 3 is a block diagram illustrating an electrical control system provided in the vehicle for controlling the automatic transmission 10 shown in FIG. 1, and the like. The amount of operation Acc of an accelerator pedal 50, generally known as the accelerator operation amount, is detected by an accelerator operation amount sensor 52, from which a signal indicating the accelerator operation amount Acc is supplied to the electronic control device 90. The accelerator pedal 50 is depressed in accordance with the driver's requested output amount, and corresponds to an accelerator operating member. The accelerator operation amount Acc corresponds to a requested output amount. Further provided are an engine rotation speed sensor 58 for detecting the rotation speed NE of the engine 30, an intake air amount sensor 60 for detecting an intake air amount Q of the engine 30, an intake air temperature sensor 62 for detecting the temperature TA of intake air, an idle switch-equipped throttle sensor 64 for detecting the fully closed state (idle state) and the degree of opening θTH of an electronic throttle valve of the engine 30, a vehicle speed sensor 66 for detecting the vehicle speed V (corresponding to the rotation speed NOUT of the output rotating member 24), a cooling water temperature sensor 68 for detecting the cooling water temperature TW of the engine 30, a brake switch 70 for detecting the presence/absence of operation of a foot brake pedal 69, that is, a service brake, a lever position sensor 74 for detecting the lever position (operation position) PSH of a shift lever 72, a turbine rotation speed sensor 76 for detecting the turbine rotation speed (=the rotation speed NIN of the input shaft 22), an AT oil temperature sensor 78 for detecting the AT oil temperature TOIL, that is, the temperature of the operating oil in the hydraulic control circuit 98, etc. These sensors and switches supply signals indicating the engine rotation speed NE, the intake air amount Q, the intake air temperature TA, the throttle valve opening degree θTH, the vehicle speed V, the engine cooling water temperature TW, the presence/absence of brake operation, the lever position PSH of the shift lever 72, the turbine rotation speed NT, the AT oil temperature TOIL, etc., to the electronic control device 90.

The electronic control device 90 is, for example, a so-called microcomputer that includes a ROM, a RAM, a CPU, input/output interfaces, etc. The CPU, using the temporary storage function of the RAM, processes input signals, and controls the linear solenoid valves SL1 to SL5, and executes an automatic shift control, an abnormality-time shift control, etc.

Figure 6:
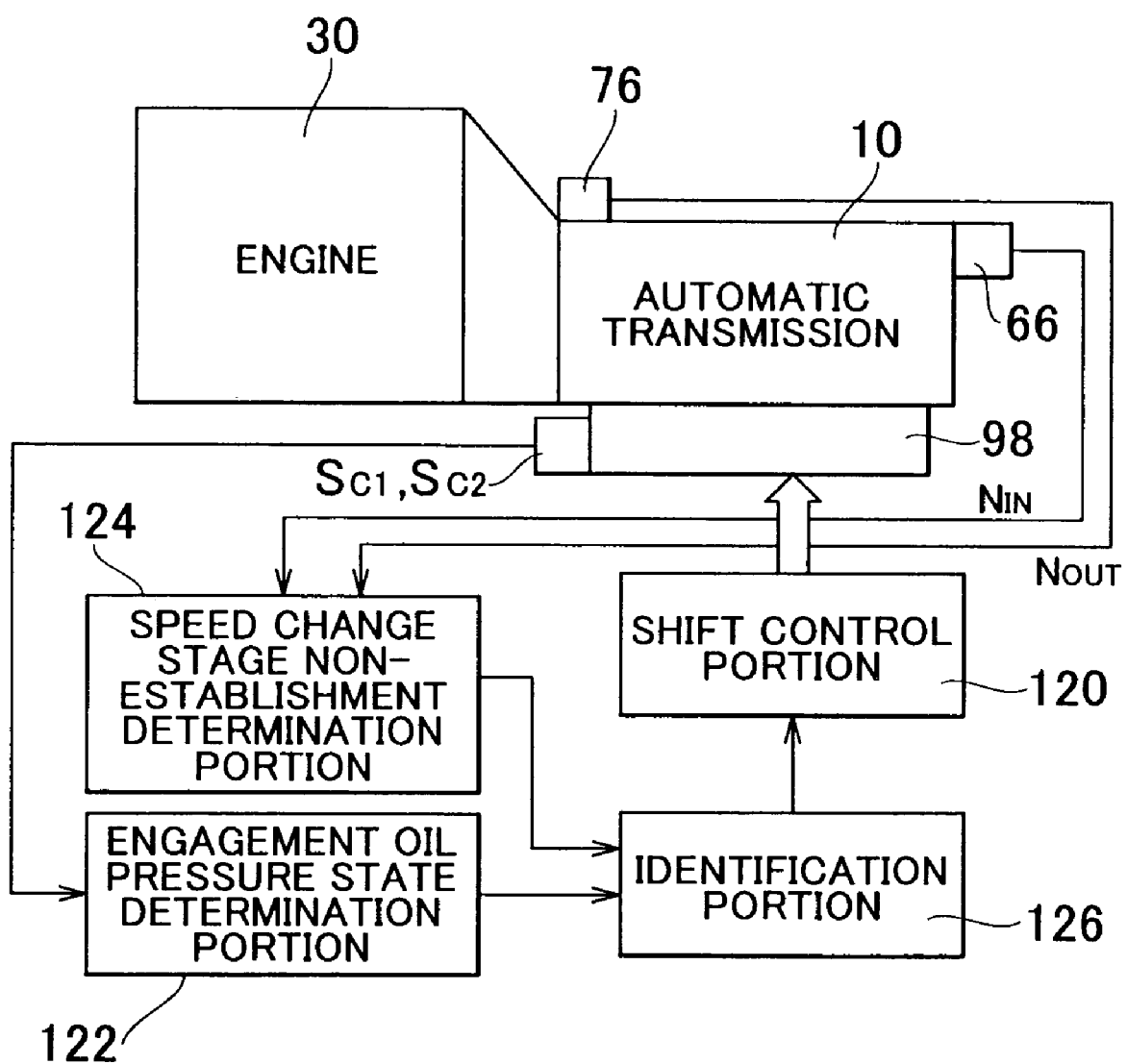
FIG. 6 is a functional block diagram illustrating portions of a control function of an electronic control device shown in FIG. 3.
Figure 7:
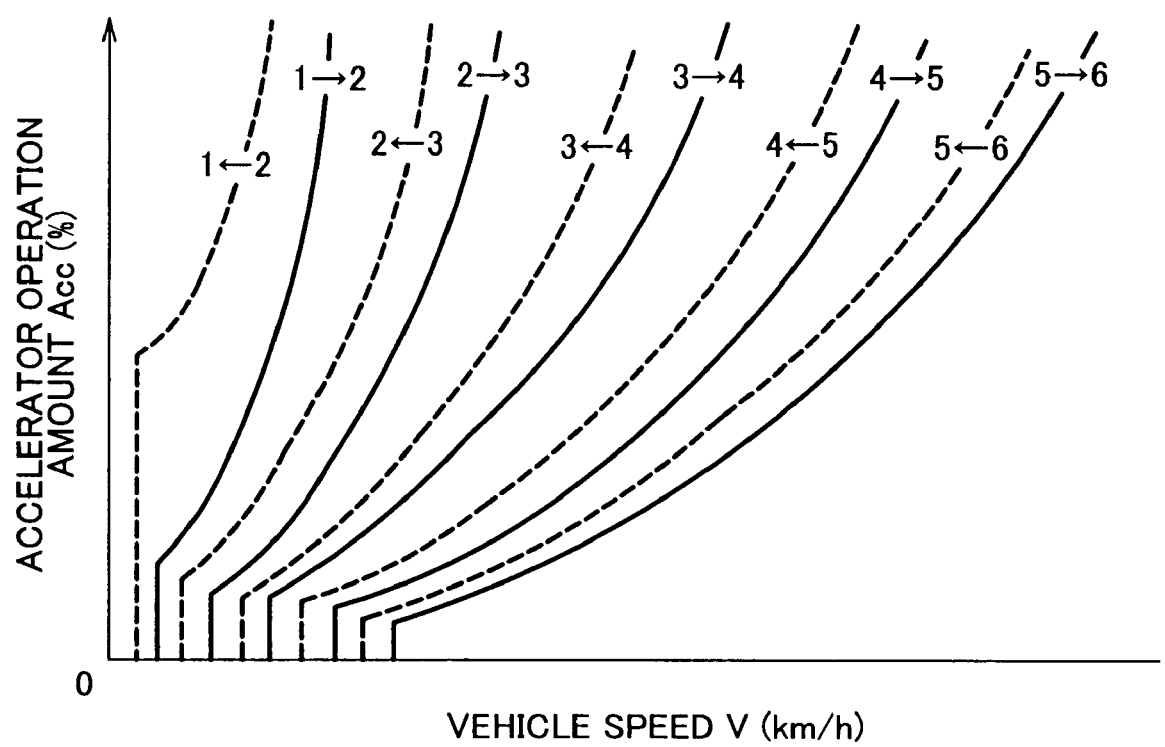
FIG. 7 is a diagram showing an example of a shift chart used by an automatic shift control portion shown in FIG. 6.

FIG. 6 is a functional block diagram illustrating portions of a control function of the electronic control device 90. In FIG. 6, a shift control portion 120 performs shift judgment, for example, from a pre-stored shift chart as shown in FIG. 7, on the basis of the actual vehicle speed V and the accelerator operation amount Acc, and then produces a shift output for causing a judged shift to be carried out, so as to control some of the linear solenoid valves SL1 to SL5 so that two of the clutches C1, C2 and the brake B1, B2, B3 are engaged. For example, if the shift output is an output for achieving the 6th speed gear stage, the shift control portion 120 outputs drive signals for engaging the clutch C2 and the brake B1.

An engagement oil pressure state determination portion 122 determines the state of engagement of the clutch C1 and/or clutch C2 on the basis of whether or not there is generation of the engagement oil pressure of the clutch C1 and/or the clutch C2, which is a requirement for achieving any one of the forward gear stages, or whether or not the magnitude of the engagement oil pressure generated corresponds to the shift output. For example, the engagement oil pressure state determination portion 122 determines whether or not the engagement oil pressure is being detected in the hydraulic actuator AC1 of the clutch C1 or in the hydraulic actuator AC2 of the clutch C2 by the hydraulic switch SC1 or the hydraulic switch SC2.

A speed change stage non-establishment determination portion 124 computes an actual speed change ratio γ (=NIN/NOUT) of the automatic transmission 10 on the basis of the rotation speed NIN of the input shaft 22 and the rotation speed NOUT of the output rotating member 24. On the basis that the actual speed change ratio γ has exceeded the speed change ratio γn of the gear stage designated by the shift output determined by the shift control portion 120 from the relationship shown in FIG. 7, the speed change stage non-establishment determination portion 124 determines that the speed change stage corresponding to the shift output will not be established. For example, in the case where the shift output designates the 4th speed, it is determined that the speed change stage corresponding to the shift output will not be established, on the basis that the actual speed change ratio γ has exceeded the speed change ratio γ4 of the 4th speed. This abnormal state is usually caused by the slipping or release of the hydraulic friction engagement devices that are to be engaged, and is a so-called neutral fail where the power transfer path in the automatic transmission 10 is in a released or semi-released state. Therefore, the speed change stage non-establishment determination portion 124 is also a neutral fail determination portion that determines whether a neutral fail has occurred.

When the speed change stage non-establishment determination portion 124 has determined that the speed change stage corresponding to the predetermined shift output will not be established, an identification portion 126 identifies the hydraulic friction engagement device that has undergone a bad engagement that is a cause of the non-establishment of the speed change stage, on the basis of a result of determination provided by the engagement oil pressure state determination portion 122. For example, when the shift output is for the 6th speed but it is determined that the 6th speed gear stage is not established, the identification portion 126 identifies the brake B1 as having a bad engagement if the engagement oil pressure for the clutch C2 is generated and is normal, and identifies the clutch C2 as having a bad engagement if the engagement oil pressure for the clutch C2 is not generated and the non-generation thereof is abnormal. Furthermore, when the shift output is for the 4th speed but it is determined that the 4th speed gear stage is not established, the identification portion 126 identifies the clutch C1 as having a bad engagement if the engagement oil pressure for the clutch C1 is not generated and the non-generation thereof is abnormal, and identifies the clutch C2 as having a bad engagement if the engagement oil pressure for the clutch C2 is not generated and the non-generation thereof is abnormal. Still further, when the shift output is for the 2nd speed but it is determined that the 2nd speed gear stage is not established, the identification portion 126 identifies the brake B1 as having a bad engagement if the engagement oil pressure for the clutch C1 is generated and is normal, and identifies the clutch C1 as having a bad engagement if the engagement oil pressure for the clutch C1 is not generated and the non-generation thereof is abnormal. The bad-engagement failure of the hydraulic friction engagement device identified by the identification portion 126 is a failure that has occurred as a result, and the site of failure includes not only the hydraulic friction engagement device itself, but also the appliances for controlling the device, for example, the linear solenoid valve, and the like.

When the identification portion 126 has identified a hydraulic friction engagement device having a bad engagement, the shift control portion 120 changes to a speed change stage next to that speed change stage whose achievement requirement is the engagement of the hydraulic friction engagement device identified as having a bad engagement, for example, to the speed change stage that is one stage toward the low speed side from the hydraulic friction engagement device having a bad engagement, and then executes the shift control using the speed change stages other than the speed change stages whose achievement requirement is the engagement of the hydraulic friction engagement device. For example, in the case where the shift output is for the 6th speed but it is determined that the 6th speed gear stage is not established, and where the brake B1 is identified as having a bad engagement, the shift control portion 120 establishes the 5th speed gear stage instead of the 6th speed gear, and from then on, executes the shift control using the 1st speed and the 3rd to 5th speeds, that is, the speeds other than the 6th speed and the 2nd speed which require the brake B1 for the achievement thereof.

Figure 8:
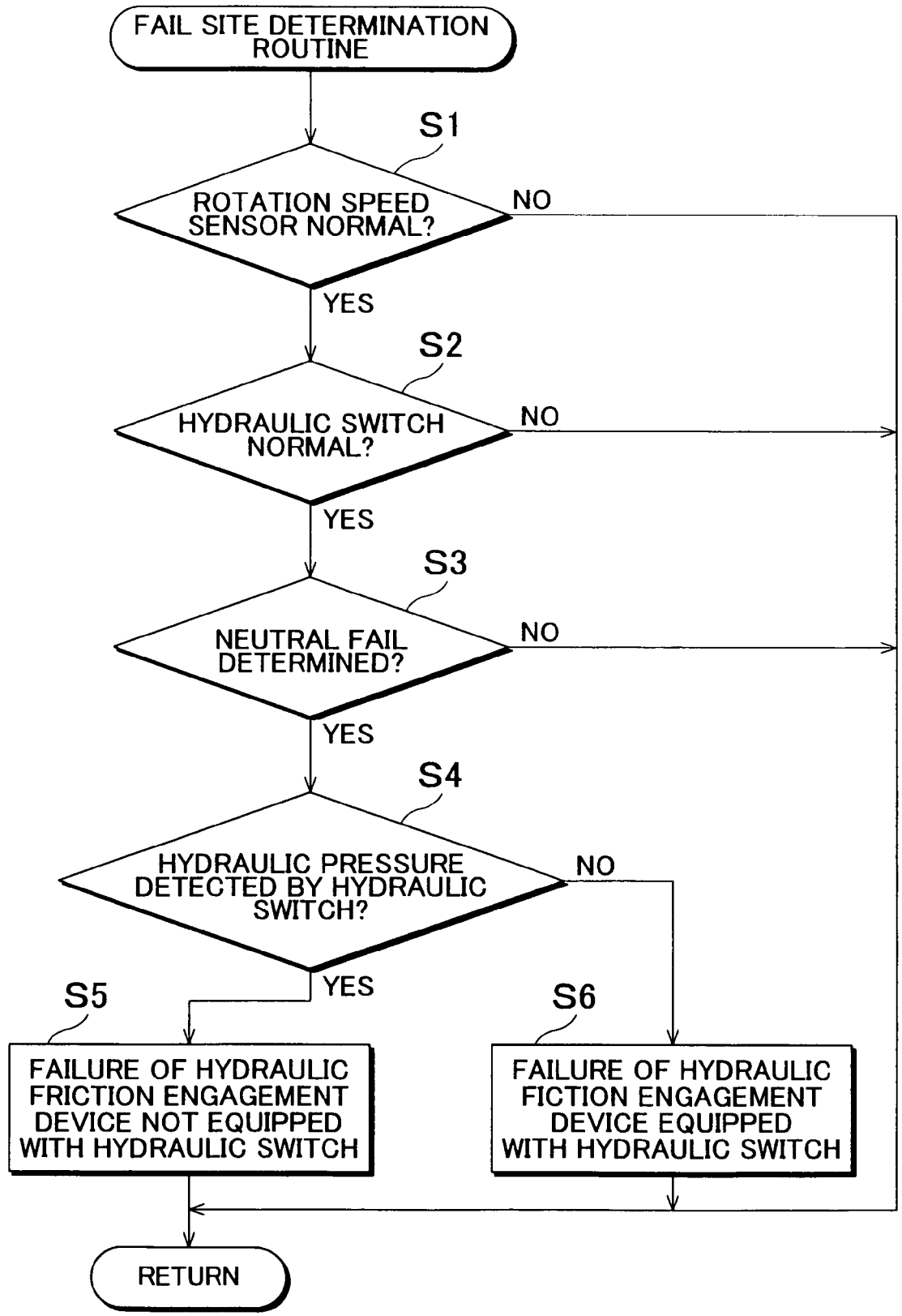
FIG. 8 is a flowchart illustrating portions of a control operation of the electronic control device shown in FIG. 3.

FIG. 8 is a flowchart illustrating portions of a control operation of the electronic control device 90. The routine illustrated by this flowchart is executed repeatedly for every shift output or on a predetermined cycle of about several ms to several ten ms. In FIG. 8, at step (hereinafter, "step" will be omitted) S1, it is judged whether or not rotation speed sensors 66, 76 are normal, for example, on the basis of the output signals produced thereby during the running of the vehicle. If the judgment at S1 is in the negative, the routine is ended. If the judgment is in the affirmative, it is judged at S2 whether or not the hydraulic switch SC1 and the hydraulic switch SC2 are normal, for example, on the basis of the output signals thereof under a predetermined condition. If the judgment at S2 is in the negative, the routine is ended. If the judgment is in the affirmative, the process proceeds to S3, which corresponds to the speed change stage non-establishment determination portion 124. At S3, it is judged whether or not the speed change stage corresponding to the shift output fails to be established, that is, whether or not the automatic transmission 10 is in the neutral fail state, on the basis of whether or not the actual speed change ratio $\gamma$ (=NIN/NOUT) of the automatic transmission 10 has exceeded the speed change ratio $\gamma n$ of the gear stage designated by the shift output.

At S4, which corresponds to the engagement oil pressure state determination portion 122, it is judged whether or not the present state is a state where the engagement oil pressures of the clutch C1 and the clutch C2 are being generated, that is, a state where the engagement oil pressures thereof have a value that sufficiently allows completion of the engagement, that is, a state where there is no abnormality caused by a bad engagement, on the basis of the signals from the hydraulic switch SC1 and the hydraulic switch SC2. Then, at one of S5 and S6, which correspond to the identification portion 126, the hydraulic friction engagement device having a bad engagement that is a cause of the non-establishment of the predetermined speed change stage corresponding to the predetermined shift output is identified.

That is, at S5, which is executed if the judgment at S4 is in the affirmative, the hydraulic friction engagement device not equipped with the hydraulic switch SC1 or the hydraulic switch SC2 is identified as having a failure. For example, if when the shift output designates the 5th speed gear stage the judgment is in the affirmative at S3 and S4, it is identified that, of the clutch C2 and the brake B3, which are the two hydraulic friction engagement devices for achieving the 5th speed gear stage, the brake B3 has a failure. However, at S6, which is executed if the judgment at S4 is in the negative, the hydraulic friction engagement device equipped with the hydraulic switch SC1 or the hydraulic switch SC2 is identified as having a failure. For example, if when the shift output designates the 5th speed gear stage the judgment at S3 is in the affirmative and the judgment at S4 is in the negative, it is identified that, of the clutch C2 and the brake B3, which are the two hydraulic friction engagement devices for achieving the 5th speed gear stage, the clutch C2 has a failure.

As described above, according to the embodiment, if the speed change stage non-establishment determination portion 124 (S3) determines that the predetermined speed change stage corresponding to a predetermined shift output is not established, the identification portion 126 (S5, S6) identifies the hydraulic friction engagement device having a bad engagement that is a cause of the non-establishment of the speed change stage, on the basis of the result of determination provided by the engagement oil pressure state determination portion 122 (S4). Therefore, when a failure occurs, the site of occurrence of the failure can be identified.

Furthermore, according to the embodiment, if, of the two hydraulic friction engagement devices for achieving the predetermined speed change stage corresponding to a predetermined shift output, the clutch C1 or C2, which is the aforementioned predetermined hydraulic friction engagement device, has a normal state of engagement oil pressure, then the identification portion 126 (S5, S6) identifies that, of the hydraulic friction engagement devices for establishing the predetermined speed change stage, the hydraulic friction engagement device different from the clutch C1 or C2 has a failure. Conversely, if the clutch C1 or C2 has an abnormal state of engagement oil pressure, the identification portion 126 (S5, S6) identifies that, of the hydraulic friction engagement devices for achieving the predetermined speed change stage, the clutch C1 or C2 has a failure. Therefore, according to the embodiment, when a failure occurs, the site of occurrence of the failure can be identified.

Still further, according to the embodiment, the speed change stage non-establishment determination portion 124 (S3) determines that the neutral fail of the automatic transmission 10 has occurred, on the basis of the rotation speed NIN of the input shaft 22 of the automatic transmission 10 and the rotation speed NOUT of the output rotating member 24, that is, if the actual speed change ratio $\gamma$ (=NIN/NOUT) of the automatic transmission 10, which is a ratio between the rotation speed NIN of the input shaft 22 and the rotation speed NOUT of the output rotating member 24, exceeds the speed change ratio $\gamma n$ of the gear stage designated by the shift output. Therefore, according to the embodiment, on the basis of occurrence of the neutral fail, it is determined that the predetermined speed change stage corresponding to the predetermined shift output is not established.

Furthermore, according to the embodiment, the automatic shift control portion 120 produces shift outputs for achieving, of the speed change stages of the automatic transmission 10, the speed change stages other than the speed change stages that are established on the condition that the hydraulic friction engagement device identified by the identification portion 126 (S5, S6) is engaged. Therefore, since, when a hydraulic friction engagement device has failed, the speed change stage is determined from the speed change stages other than the speed change stages that require, as a condition for the establishment thereof, the engagement of the hydraulic friction engagement device identified as having a failure by the identification portion 126, the embodiment reduces the considerable change in the speed change ratio caused by occurrence of a failure during the running of the vehicle, and makes it possible to take off the vehicle after a temporary stop, and thus prevents, as much as possible, occurrence of impediments to the running of the vehicle.

Next, a second embodiment of the invention will be described. In the description below, the portions common to the embodiments are represented by like numerals in the drawings, and will not be redundantly described. The embodiments described in this specification are applicable to the same objects unless the application is technologically incompatible.

Figure 9:
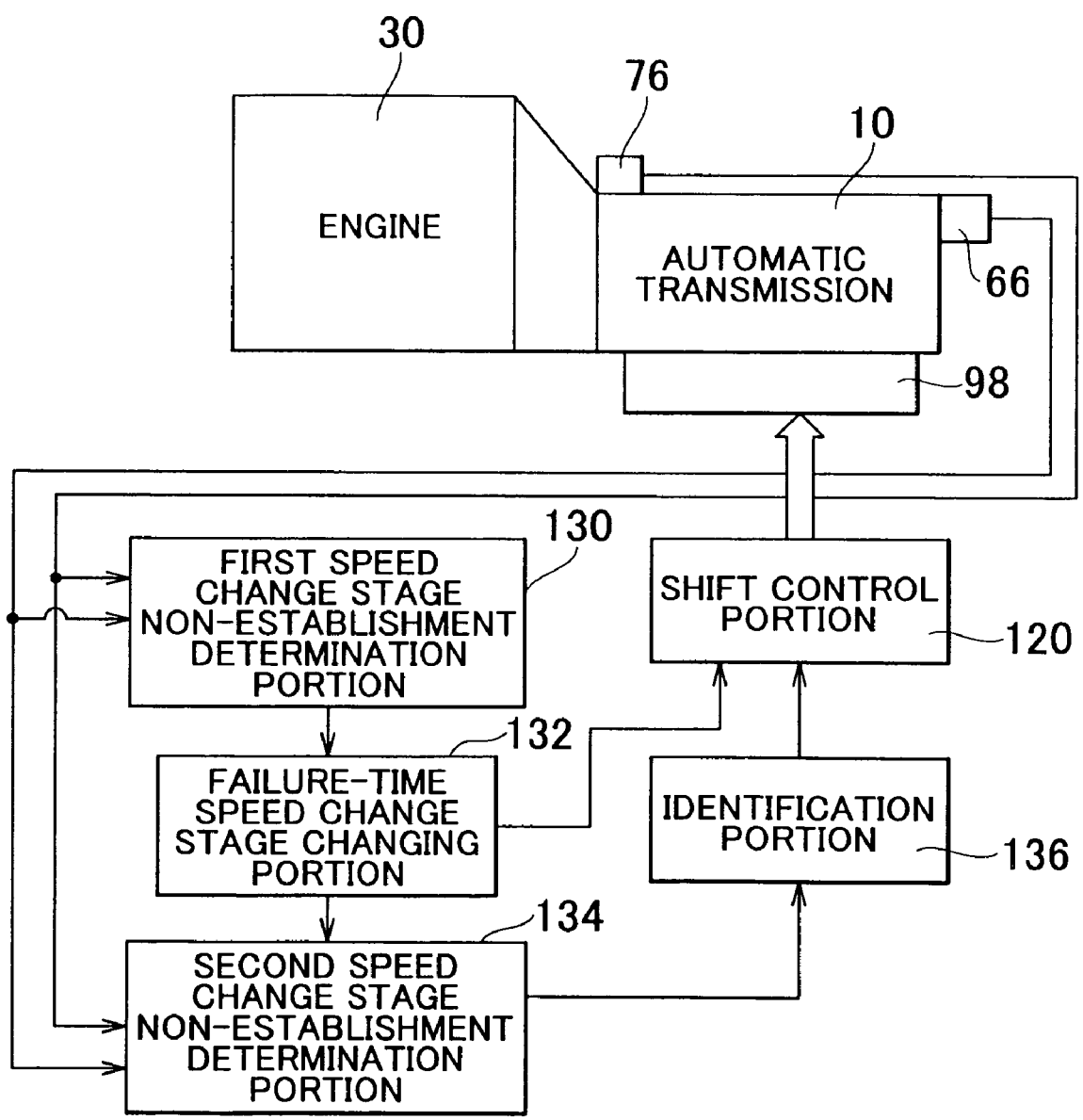
FIG. 9 is a functional block diagram illustrating portions of a control function of an electronic control device in another embodiment of the invention.

FIG. 9 is a functional block diagram illustrating portions of a control function of the electronic control device 90 in the second embodiment. In FIG. 9, a first speed change stage non-establishment determination portion 130 determines that a first speed change stage corresponding to a predetermined first shift output that the shift control portion 120 determines from the relationship shown in FIG. 7 and produces during the running of the vehicle is not established. For example, if the first shift output designates the 6th speed, the first speed change stage non-establishment determination portion 130 determines an abnormal state where the speed change stage corresponding to the first shift output is not established on the basis of the occurrence of the neutral fail where the actual speed change ratio $\gamma$ (=NIN/NOUT) exceeds the speed change ratio $\gamma 6$ of the 6th speed.

If the first speed change stage non-establishment determination portion 130 determines that the aforementioned first speed change stage is not established, a failure-time speed change stage changing portion 132 generates a second shift output which releases one of the hydraulic friction engagement devices that establish the aforementioned first speed change stage and which engages another hydraulic friction engagement device, so as to establish a second speed change stage that is different from the first speed change stage. For example, if the aforementioned first speed change stage is the 6th speed gear stage and it is determined that the 6th speed gear stage is not established, the 5th speed gear stage, which is one stage toward the low speed side from the 6th speed gear stage, is to be achieved. To this end, the failure-time speed change stage changing portion 132 causes the shift control portion 120 to output to the hydraulic control circuit 98 a second shift output that causes the brake B1, which, together with the clutch C2, establishes the sixth speed gear stage, to be released, and that causes another hydraulic friction engagement device, that is, the brake B3, to be engaged. In this case, the 5th speed gear stage is the aforementioned second speed change stage.

The second speed change stage non-establishment determination portion 134 determines that the second speed change stage corresponding to the aforementioned second shift output is not established. For example, if the aforementioned second shift output designates the 5th speed gear stage as mentioned above, the second speed change stage non-establishment determination portion 134 determines an abnormal state where the speed change stage corresponding to the second shift output is not established, on the basis of the occurrence of the neutral fail where the actual speed change ratio $\gamma$ (=NIN/NOUT) exceeds the speed change ratio $\gamma 5$ of the 5th speed.

The identification portion 136 identifies the hydraulic friction engagement device having a bad engagement, on the basis of whether the second speed change stage non-establishment determination portion 134 has determined that the second speed change stage is not established. That is, if the second speed change stage non-establishment determination portion 134 has determined that the second speed change stage has been established, the identification portion 136 identifies that, of the hydraulic friction engagement devices for establishing the first speed change stage, the hydraulic friction engagement device released by the second shift output has a failure. If it is determined that the second speed change stage is not established, the identification portion 136 identifies that, of the hydraulic friction engagement devices for establishing the first speed change stage, the hydraulic friction engagement device not released by the second shift output has a failure. For example, let it assumed that the first speed change stage is the 6th speed gear stage and the second speed change stage is the 5th speed gear stage as mentioned above. In this case, if it is determined that the 5th speed gear stage corresponding to the second shift output has been established, it is then identified that the brake B1, which, together with the clutch C2, establishes the sixth speed gear stage, which has been released by the second shift output, has a failure. Conversely, if it is determined that the 5th speed gear stage corresponding to the second shift output is not established, it is then identified that, of the clutch C2 and the brake B1 for establishing the 6th speed gear stage, the clutch C2, not released by the second shift output, has a failure.

Figure 10:
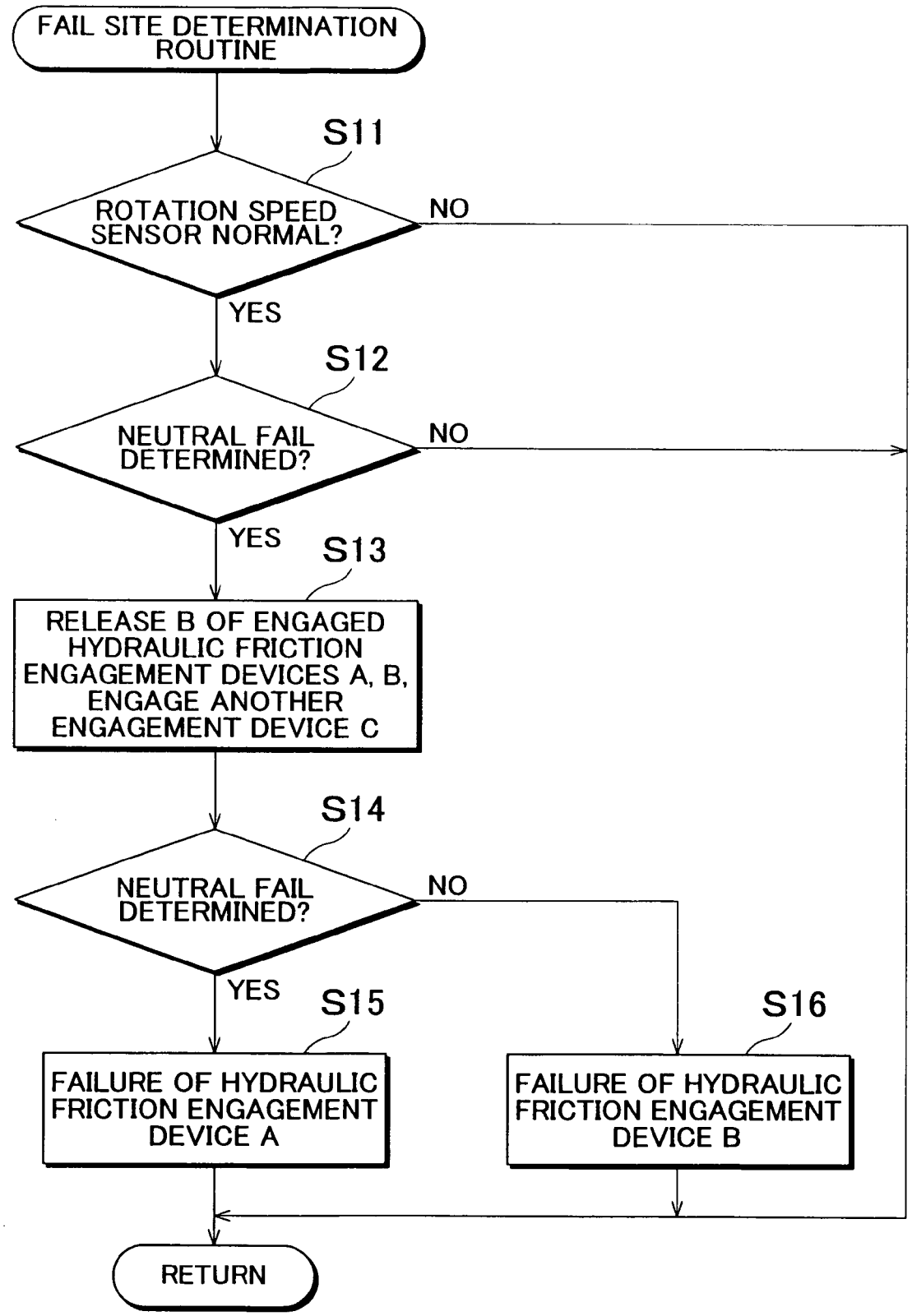
FIG. 10 is a flowchart illustrating portions of a control operation of the electronic control device in the embodiment shown in FIG. 9.

FIG. 10 is a flowchart illustrating portions of a control operation of the electronic control device 90 in this embodiment. At S11 in FIG. 10, which is similar to S1 in FIG. 8, it is judged whether or not the rotation speed sensors 66, 76 are normal, for example, on the basis of the output signals produced thereby during the running of the vehicle. If the judgment at S11 is in the negative, the routine is ended. If the judgment is in the affirmative, the process proceeds to S12, which corresponds to the first speed change stage non-establishment determination portion 130. At S12, it is judged whether or not the speed change stage corresponding to the first shift output determined by the shift control portion 120 from the relationship shown in FIG. 7, for example, the 6th speed gear stage, fails to be established, that is, whether or not the automatic transmission 10 is in the neutral fail state, on the basis whether of not the actual speed change ratio $\gamma$ (=NIN/NOUT) of the automatic transmission 10 has exceeded the speed change ratio $\gamma 6$ of the 6th speed gear stage designated by the first shift output. If the judgment at S12 is in the negative, the routine is ended. If the judgment is in the affirmative, the process proceeds to S13, which corresponds to the failure-time speed change stage changing portion 132. At S13, in order to establish a second speed change stage different from the first speed change stage, for example, the 5th speed gear stage, a second shift output as described below is produced. That is, the second shift output causes, of the clutch C2 and the brake B1 for establishing the 6th gear stage, the brake B1 to be released, and causes another hydraulic friction engagement device, that is, the brake B3, to be engaged.

Next, at S14, which corresponds to the second speed change stage non-establishment determination portion 134, it is judged whether or not the speed change stage corresponding to the aforementioned second shift output, for example, the 5th speed gear stage, fails to be established, that is, whether or not the automatic transmission 10 is in the neutral fail state, on the basis whether of not the actual speed change ratio γ (=NIN/NOUT) of the automatic transmission 10 has exceeded the speed change ratio γ5 of the 5th speed gear stage designated by the second shift output. Then, one of S15 and S16, which correspond to the identification portion 136, is executed, at which the hydraulic friction engagement device having a bad engagement that is a cause of the non-establishment of the predetermined speed change stage corresponding to the predetermined first shift output is identified.

That is, if the judgment at S14 is in the affirmative, it means that the present state is, for example, a state where since the 6th speed gear stage, that is, the first speed change stage, was not established by the first shift output, the second shift output was produced to establish the 5th speed gear stage, that is, the second speed change stage; however, the 5th gear is not established. Therefore, at S15, of the clutch C2 and the brake B1 for establishing the 6th speed gear stage, the clutch C2, not released by the second shift output, is identified as having a failure. Conversely, if the judgment at S14 is in the negative, it means that the present state is, for example, a state where since the 6th speed gear stage, that is, the first speed change stage, was not established by the first shift output, the second shift output was produced to establish the 5th speed gear stage, that is, the second speed change stage, and the 5th gear stage has been established. At S16, of the clutch C2 and the brake B1 for establishing the 6th speed gear stage, the brake B1, released by the second shift output, is identified as having a failure.

As described above, according to the embodiment, if the first speed change stage non-establishment determination portion 130 (S12) determines that the first speed change stage corresponding to the first shift output is not established, the failure-time speed change stage changing portion 132 (S13) generates a second shift output which releases one of the hydraulic friction engagement devices that establish the aforementioned first speed change stage and which engages another hydraulic friction engagement device, so as to establish a second speed change stage. Then, the identification portion 136 (S15, S16) identifies the hydraulic friction engagement device that has a bad engagement on the basis of whether the second speed change stage non-establishment determination portion 134 (S14) has determined that the second speed change stage corresponding to the second shift output is not established. Therefore, when a failure occurs, the site of occurrence of the failure can be identified. In this case, it is not necessary to have a hydraulic sensor, the hydraulic switch SC1 or the hydraulic switch SC2 that detects the state of engagement oil pressure of a hydraulic friction engagement device, or the engagement oil pressure state determination portion 122 that determines the state of engagement oil pressure on the basis of the signals from such sensors or switches.

Furthermore, according to the second embodiment, the first speed change stage non-establishment determination portion 130 (S12) determines occurrence of the neutral fail of the automatic transmission 10 on the basis of the input shaft rotation speed NIN and the output shaft rotation speed NOUT of the automatic transmission 10. Therefore, on the basis of the occurrence of the neutral fail, it can easily be determined that the speed change stage corresponding to the first shift output is not established.

Furthermore, according to the second embodiment, the second speed change stage non-establishment determination portion 134 (S14) determines occurrence of the neutral fail of the automatic transmission 10 on the basis of the input shaft rotation speed NIN and the output shaft rotation speed NOUT of the automatic transmission 10. Therefore, on the basis of the occurrence of the neutral fail, it can easily be determined that the speed change stage corresponding to the second shift output is not established.

Furthermore, according to the second embodiment, if it is determined that the second speed change stage has been established, the identification portion 136 (S15, S16) identifies that, of the hydraulic friction engagement devices that establish the first speed change stage, the hydraulic friction engagement device released by the second shift output has a failure. If it is determined that the second speed change stage is not established, the identification portion 136 (S15, S16) identifies that, of the hydraulic friction engagement devices that establish the first speed change stage, the hydraulic friction engagement device not released by the second shift output has a failure. Therefore, when a failure occurs, the site of occurrence of the failure can be identified.

Furthermore, according to the embodiment, the automatic shift control portion 120 produces shift outputs for achieving, of the speed change stages of the automatic transmission 10, the speed change stages other than the speed change stages that are established on the condition that the hydraulic friction engagement device identified by the identification portion 136 (S15, S16) is engaged. Therefore, since, when a hydraulic friction engagement device has failed, the speed change stage is determined from the speed change stages other than the speed change stages that require, as a condition for the establishment thereof, the engagement of the hydraulic friction engagement device identified as having a failure by the identification portion 136, the embodiment reduces the considerable change in the speed change ratio caused by occurrence of a failure during the running of the vehicle, and makes it possible to take off the vehicle after a temporary stop, and thus prevents, as much as possible, occurrence of impediments to the running of the vehicle.

While the embodiments of the invention have been described in detail with reference to the drawings, those embodiments are merely illustrative. The invention can be carried out with various modifications and improvements on the basis of the knowledge of those of ordinary skill in the art.

Other embodiments will be described. As for the automatic transmission, a planetary gear type automatic transmission having a plurality of planetary gear sets that are provided on a common axis is preferably used. However, a planetary gear type automatic transmission having a plurality of planetary gear sets that are provided on a plurality of axes parallel to each other may also be used. Furthermore, it is also possible to adopt various types of automatic transmissions in which shifting is performed by selectively engaging and releasing a plurality of hydraulic friction engagement devices, such as a type that allows the use of a planetary gear type automatic transmission that performs shifting and changes over a plurality of input paths, an FF type, an FR type, etc.

As for the hydraulic friction engagement devices, the devices widely used include multi-disc type and single-disc type clutches and brakes that are engaged by hydraulic actuators, or belt-type brakes. The oil pump that supplies operating oil for engaging the hydraulic friction engagement devices may be, for example, an oil pump that is driven by a vehicle-running power source, such as an engine or the like, to eject operating oil. The oil pump may also be driven by a dedicated electric motor that is provided separately from the vehicle-running power source.

The aforementioned hydraulic friction engagement devices are actuated respectively by the hydraulic actuators. The hydraulic actuators are provided with corresponding shift valves. Each actuator is supplied with an engagement pressure output by a corresponding one of the shift valves in accordance with a command from the electronic control device. The shift valves are so-called linear solenoid valves each of which has an electromagnetic solenoid that outputs thrust, and a spool on which the thrust from the electromagnetic solenoids is exerted. Provided at an end side of the spool are a feedback oil chamber to which output oil pressure is led in order to generate thrust in the valve closing direction, and a spring that exerts thrust on the spool in the valve closing direction. By the balance between these thrusts and the valve-opening direction thrust generated by the electromagnetic solenoid provided on the other end side, the output oil pressure is regulated. The shift valves may be ON-OFF solenoid valves that continuously control the output oil pressure by duty control. In this case, an accumulator for absorbing the pulsation of the output oil pressure is used if necessary.

The shift valves are provided, for example, corresponding on a one-to-one basis to the hydraulic friction engagement devices. Various other manners of provision are also possible. For example, if there are hydraulic friction engagement devices that are simultaneously engaged or simultaneously engaged and released, it is possible to provide a common shifting solenoid valve for those hydraulic friction engagement devices.

The above-described automatic transmission achieves one of the forward speed change stages by the engagement of two hydraulic friction engagement devices selected from the plurality of hydraulic friction engagement devices. The aforementioned predetermined hydraulic friction engagement devices are two hydraulic friction engagement devices, the engagement of one or the other of which is a requirement for achieving the forward speed change stages.

Furthermore, oil pressure detection devices, for example, hydraulic sensors or hydraulic switches, which detect the engagement pressures of the aforementioned predetermined hydraulic friction engagement devices, are provided. The engagement oil pressure state determination portion determines the state of engagement oil pressure of the predetermined hydraulic friction engagement devices on the basis of the engagement oil pressure detected by the oil pressure detection devices. This engagement oil pressure state determination portion determines whether or not the engagement state of a predetermined hydraulic friction engagement device of two hydraulic friction engagement devices that are to be engaged corresponding to the shift output of the automatic transmission is normal.

The speed change stage non-establishment determination portion computes the actual speed change ratio of the automatic transmission (=the input shaft rotation speed/the output shaft rotation speed) from the input shaft rotation speed and the output shaft rotation speed of the automatic transmission. The speed change stage non-establishment determination portion determines that the predetermined speed change stage corresponding to a predetermined shift output is not established, on the basis that the actual speed change ratio has exceeded the criterion that is set for each speed change stage, that is, on the basis that the neutral fail of the automatic transmission has occurred. The aforementioned "neutral fail of the automatic transmission" includes not only the state where power transfer path in the automatic transmission is fully released, but also the state where due to the slipping of a hydraulic friction engagement device, the speed change ratio of the automatic transmission has become greater than the speed change ratio of a predetermined speed change stage.

The automatic shift control portion produces a shift output for achieving, of the plurality of speed change stages of the automatic transmission, a speed change stage next to a speed change stage that is established on the condition that the hydraulic friction engagement device identified by the identification means is engaged. Therefore, the speed change stage is changed from the speed change stage that requires the engagement of the hydraulic friction engagement device having a bad engagement at the moment, to a speed change stage next thereto. Thus, the changing is made to the speed change stage that is suitable to the vehicle running state, next to the speed change stage that is to be achieved by the existing shift output. Therefore, the discomfort feeling is reduced as much as possible.

Furthermore, it is appropriate that the automatic transmission has a plurality of forward gear stages, and the number of forward speeds is preferably four to eight. The forward gear stages of the automatic transmission are selectively established through combinations of two or three hydraulic friction engagement devices selected from the plurality of hydraulic friction engagement devices. The plurality of hydraulic friction engagement devices include one or more predetermined hydraulic friction engagement devices that are always engaged as a requirement for achieving the forward gear stages.

What is claimed is:

1. A hydraulic control apparatus of a vehicular automatic transmission, comprising:
    a plurality of hydraulic friction engagement devices that are selectively engaged and released to establish a plurality of forward speed change stages of different speed change ratios, wherein a predetermined forward speed change stage is achieved through engagement of predetermined friction engagement devices of the plurality of friction engagement devices;
    an engagement oil pressure state determination portion that determines a state of engagement oil pressure of one of the predetermined friction engagement devices;
    a speed change stage non-establishment determination portion that determines that a predetermined speed change stage corresponding to a predetermined shift output is not established; and
    an identification portion that identifies a friction engagement device having a bad engagement that is a cause of non-establishment of the speed change stage based on the state of engagement oil pressure determined by the engagement oil pressure state determination portion if it is determined by the speed change stage non-establishment determination portion that a predetermined speed change stage corresponding to the predetermined shift output is not established.

2. The apparatus according to claim 1,
    wherein the identification portion identifies, of friction engagement devices that establish the predetermined speed change stage, a friction engagement device different from the predetermined friction engagement device if the state of engagement oil pressure of the predetermined friction engagement device is normal, and
    wherein the identification portion identifies, of the friction engagement devices that establish the predetermined speed change stage, the predetermined friction engagement device if the state of engagement oil pressure of the predetermined friction engagement device is abnormal.

3. The apparatus according to claim 1, wherein the speed change stage non-establishment determination portion determines occurrence of a neutral fail of the automatic transmission based on an input shaft rotation speed and an output shaft rotation speed of the automatic transmission.

4. The apparatus according to claim 1, further comprising an automatic shift control portion that produces shift outputs for achieving, of the speed change stages of the automatic transmission, speed change stages other than the speed change stages that are established on condition that the hydraulic friction engagement device identified by the identification portion is engaged.

5. A hydraulic control apparatus of a vehicular automatic transmission, comprising:
a plurality of hydraulic friction engagement devices that are selectively engaged and released to establish a plurality of forward speed change stages of different speed change ratios, wherein a predetermined forward speed change stage is achieved through engagement of predetermined friction engagement devices of the plurality of friction engagement devices;
a first speed change stage non-establishment determination portion that determines that a first speed change stage corresponding to a first shift output is not established;
a failure-time speed change stage changing portion that generates a second shift output which releases one hydraulic friction engagement device of hydraulic friction engagement devices that establish the first speed change stage and which engages another hydraulic friction engagement device, so as to change the speed change stage to the second speed change stage, if it is determined by the first speed change stage non-establishment determination portion that the first speed change stage is not established;
a second speed change stage non-establishment determination portion that determines that the second speed change stage corresponding to the second shift output is not established; and
an identification portion that identifies a hydraulic friction engagement device having a bad engagement based on whether or not it is determined by the second speed change stage non-establishment determination portion that the second speed change stage is not established.

6. The apparatus according to claim 5, wherein the first speed change stage non-establishment determination portion determines whether or not the first speed change stage has been established by determining occurrence of a neutral fail of the automatic transmission based on an input shaft rotation speed and an output shaft rotation speed of the automatic transmission.

7. The apparatus according to claim 5, wherein the second speed change stage non-establishment determination portion determines whether or not the second speed change stage has been established by determining occurrence of a neutral fail of the automatic transmission based on an input shaft rotation speed and an output shaft rotation speed of the automatic transmission.

8. The apparatus according to claim 5,
wherein the identification portion identifies, of hydraulic friction engagement devices that establish the first speed change stage, a hydraulic friction engagement device released by the second shift output if it is determined that the second speed change stage has been established, and
wherein the identification portion identifies, of the hydraulic friction engagement devices that establish the first speed change stage, a hydraulic friction engagement device not released by the second shift output if it is determined that the second speed change stage is not established.

9. The apparatus according to claim 5, further comprising an automatic shift control portion that produces shift outputs for achieving, of the speed change stages of the automatic transmission, speed change stages other than the speed change stages that are established on condition that the hydraulic friction engagement device identified by the identification portion is engaged.

10. A hydraulic control method of a vehicular automatic transmission, comprising:
outputting a signal that engages at least first and second friction engagement devices of a plurality of hydraulic friction engagement devices, wherein a predetermined forward speed change stage is achieved through engagement of the first and second friction engagement devices;
determining a state of engagement oil pressure of the first friction engagement device;
determining whether the predetermined speed change stage corresponding to the output signal is not established; and
identifying, if it is determined that the predetermined speed change stage is not established, one of the first and second friction engagement devices as a friction engagement device having a bad engagement that is a cause of non-establishment of the predetermined speed change stage based on the state of engagement oil pressure of the first friction engagement device.

11. The method according to claim 10,
wherein if the state of engagement oil pressure of the first friction engagement device is normal, it is determined that the second friction engagement device has a failure, and
wherein if the state of engagement oil pressure of the first friction engagement device is abnormal, it is determined that the first friction engagement device has a failure.

12. The method according to claim 10, wherein if occurrence of a neutral fail of the automatic transmission is determined based on an input shaft rotation speed and an output shaft rotation speed of the automatic transmission, it is determined that the predetermined speed change stage is not established.

13. The method according to claim 10, further comprising establishing speed change stages by engaging friction engagement devices other than the friction engagement device identified as having a bad engagement.

14. A hydraulic control method of an vehicular automatic transmission, comprising:
generating a first shift output that engages at least first and second friction engagement devices of a plurality of hydraulic friction engagement device, wherein a first speed change stage is achieved through engagement of the first and second friction engagement devices;
determining whether the first speed change stage corresponding to the first shift output is not established;
generating a second shift output that releases the second friction engagement device and engages a third friction engagement device, so as to change the speed change stage to the second speed change stage, if it is determined that the first speed change stage is not established;
determining whether the second speed change stage corresponding to the second shift output is not established; and
identifying one of the first and second hydraulic friction engagement devices as being a cause of non-establishment of the first speed change stage based on whether or not it is determined that the second speed change stage is not established.

15. The method according to claim 14, wherein it is determined whether or not the first speed change stage has been established by determining occurrence of a neutral fail of the automatic transmission based on an input shaft rotation speed and an output shaft rotation speed of the automatic transmission.

16. The method according to claim 14, wherein it is determined whether or not the second speed change stage has been established by determining occurrence of a neutral fail of the automatic transmission based on an input shaft rotation speed and an output shaft rotation speed of the automatic transmission.

17. The method according to claim 14,
wherein, of the first and second hydraulic friction engagement devices that establish the first speed change stage, the second hydraulic friction engagement device released by the second shift output is identified, if it is determined that the second speed change stage has been established, and
wherein, of the first and second hydraulic friction engagement devices that establish the first speed change stage, the first hydraulic friction engagement device not released by the second shift output is identified, if it is determined that the second speed change stage is not established.

18. The method according to claim 14, further comprising establishing speed change stages by engaging friction engagement devices other than the friction engagement device identified ad having a bad engagement.

* * * * *